(12) United States Patent
Kanai et al.

(10) Patent No.: US 6,323,955 B1
(45) Date of Patent: *Nov. 27, 2001

(54) IMAGE FORMING APPARATUS

(75) Inventors: Nobuo Kanai, Toyohashi; Kenji Takeshita; Jun Kohsaka, both of Toyokawa, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,167

(22) Filed: Nov. 17, 1997

(30) Foreign Application Priority Data

Nov. 18, 1996 (JP) .................................................. 8-306417
Mar. 28, 1997 (JP) .................................................. 9-078644

(51) Int. Cl.[7] .............................. B41B 15/00; B41J 15/00
(52) U.S. Cl. ....................... 358/1.17; 358/1.19; 358/1.9; 348/144; 347/178; 347/177; 347/264; 347/262
(58) Field of Search ............................. 395/117; 399/60, 399/21, 40, 49, 66, 72, 39, 51; 347/178, 115–119, 177, 264, 262; 355/211; 358/109, 250, 1.17, 1.19, 1.9; 348/144

(56) References Cited

U.S. PATENT DOCUMENTS

| 5,396,282 | * | 3/1995 | Ogikubo ............................... 348/144 |
| 5,600,408 | * | 2/1997 | Horiuchi et al. ....................... 399/39 |
| 5,722,009 | * | 2/1998 | Haneda et al. ......................... 399/60 |
| 5,854,958 | * | 12/1998 | Tanimoto et al. ..................... 399/49 |

FOREIGN PATENT DOCUMENTS

| 1-141746 | 2/1989 | (JP) ................................ B41J/11/22 |
| 4-131750 | 5/1992 | (JP) ................................ G01N/21/89 |
| 1-112266 | 4/1989 | (JP) ................................ G03G/15/01 |

* cited by examiner

Primary Examiner—Edward Coles
Assistant Examiner—Twyler Lamb
(74) Attorney, Agent, or Firm—Sidley Austin Brown & Wood

(57) ABSTRACT

The image forming apparatus provides a plurality of recording units to form images based on their respective image data, overlaying the images formed by the plurality of recording units on a single transfer member traveling in a predetermined direction, control means to sequentially cause registration patterns of predetermined shape to be formed by the plurality of recording units, and detecting means to detect each registration pattern on the transfer member in at least two locations in both the diretion of travel of the transfer member and a direction perpendicular thereto, and output non-integrated detection values.

21 Claims, 7 Drawing Sheets

IMAGE FORMING APPARATUS

BACKGROUND OF THE INVENTION

1. Field of the Invention

The present invention relates to an image forming apparatus such as an electrophotographic copier, a laser printer, an inkjet printer and the like. The present invention specifically relates to an image forming apparatus which forms an image by combining a plurality of images on a single transfer sheet.

2. Description of the Related Art

In recent years it has become important that image forming apparatuses can reproduce full color images without image dislocation (color drift). Specifically, digital methods use a plurality of image forming units corresponding to each color are installed with integrated elements such as photosensitive members, charging devices, and developing devices, and multiple transfers are accomplished for the image formed by each unit onto a single transfer member. Position error of images formed by each image forming unit can be detected and corrected, which is necessary to obtain high precision in image reproducibility. Therefore, a predetermined registration mark or pattern is formed on the transfer member by each image forming unit, and these marks or patterns are read by detection devices to accomplish positional alignments.

For example, Japanese Laid-Open Patent Application No. 1-141746 discloses a method wherein registration marks extending in a main scan direction and a subscan direction are detected by an inclined charge-coupled device (CCD). Japanese Laid-Open Patent Application No. 4-131750 discloses a method wherein registration marks comprising straight lines extending in a main scan direction and diagonal lines inclined relative to said straight lines and extending in the same direction are formed. These registration marks are detected by a single photosensor, and the amount of dislocation is calculated and corrected.

In the former method, because the registration marks are read by a charge storage type CCD, the sampling period is long and detection precision does not allow fine resolution, or the sampling data rate must increase to accomplish fine resolution, thereby enlarging the processing unit and greatly increasing cost. The latter method, on the other hand, uses a non-integrating sensor, and avoids the aforesaid disadvantages in conjunction with the sampling period, but because the registration mark is detected at one point in the main scan direction, there are reading position errors in the main scan direction when the transfer member travels at irregular speed in the subscan direction. Furthermore, there is the possibility of inadequate detection when the pattern, skips so as to leave out part of the pattern because a combination of horizontal and vertical lines, or diagonal lines are used as the registration pattern.

SUMMARY AND OBJECTS OF THE INVENTION

An object of the present invention is to provide an image forming apparatus capable of detecting a registration pattern with high precision by using an inexpensive detection means of non-integrating type utilizing simple controls and processes.

A further object of the present invention is to provide an image forming apparatus capable of detecting a registration pattern reliably and with precision even when the registration pattern is partial and incomplete, and which is further capable of suitably correcting dislocation of overlapped images.

The image forming apparatus of the present invention attains the aforesaid objects by providing a plurality of recording units to form images based on their respective image data, overlaying the images formed by the plurality of recording units on a single transfer member traveling in one direction, control means to sequentially cause registration patterns of predetermined shape to be formed by the plurality of recording units, and detecting means to detect each registration pattern received onto the transfer member at two locations in both the direction of travel of the transfer member and a direction perpendicular thereto (i.e., main scan direction), and output non-integrated detection values.

Since a non-integrated type detecting means is used as the registration pattern detecting means, timely and continuous detection output is possible, thereby increasing pattern detection resolution and providing for simple controls and processing of detection data at low cost. Since the registration pattern is detected at two locations in the main scan direction, the position of the registration pattern in the main scan direction can be accurately detected even when the transfer member is traveling at irregular speed by reading at two detection intervals in the subscan direction.

The image forming apparatus of the present invention is provided with a plurality of recording units to develop images based on their respective image data, overlaying the images developed by the plurality of recording units on a single transfer member traveling in one direction, control means to sequentially cause registration patterns of predetermined shape to be formed by the plurality of recording units, detecting means to detect each registration pattern received onto the transfer member, and correction control means to calculate the amount of dislocation of the registration patterns detected by the detecting means and correct the position of the images formed by the recording units based on the amount of dislocation, and wherein the registration pattern extends at an incline relative to the direction of travel of the transfer member and comprises two lines which intersect at a point.

Since the shape of the registration pattern comprises two lines inclined relative to the direction of travel, a plurality of position information can be detected by the detecting means, and the amount of position dislocation can be calculated by reliably and accurately detecting a center position by averaging the detected data even when the line is partially skipped and non-printing, such that position dislocation of an image can be accurately corrected.

These and other objects and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

A first embodiment of the image forming apparatus of the present invention is described hereinafter with reference to the accompanying drawings. The first embodiment described below is applied to a full color laser printer of a tandem type.

Figure 1:
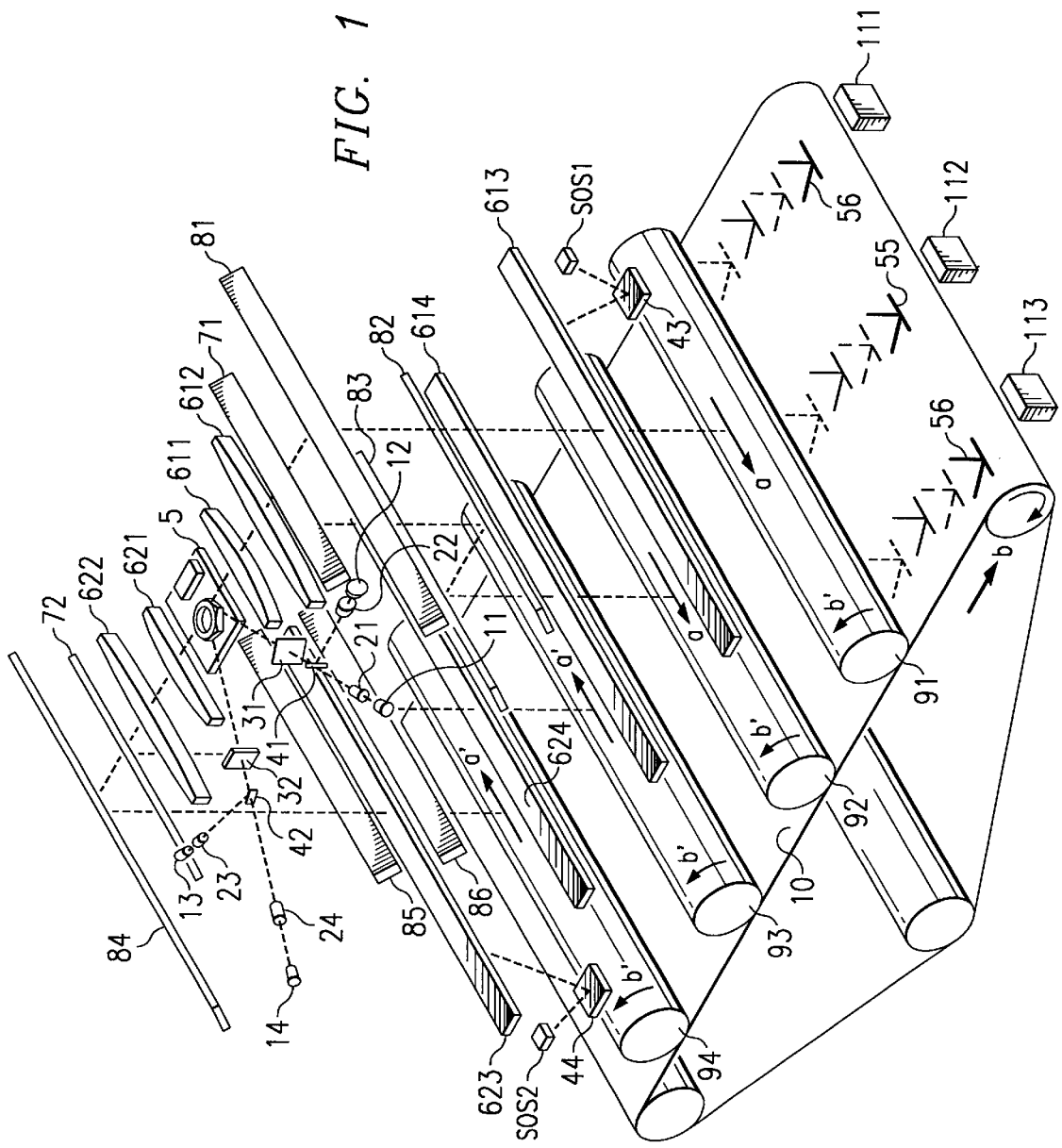
FIG. 1 is a brief perspective view of a full color laser printer of a first embodiment of the invention.

In FIG. 1, the full color printer produces full color images by forming electrostatic latent images corresponding to cyan (C), magenta (M), yellow (Y), and black (Bk) on photosensitive drums 91, 92, 93, and 94, respectively, and transferring developed toner images so as to overlay the images on a sheet disposed on transfer belt 10 and traveling in the arrow b direction. Arranged around the periphery of each photosensitive drum 91~94 are various elements such as chargers, developing devices and the like; since this type of image forming apparatus utilizes a well known electrophotographic method for the image forming process, details regarding this process are omitted.

Figure 11:
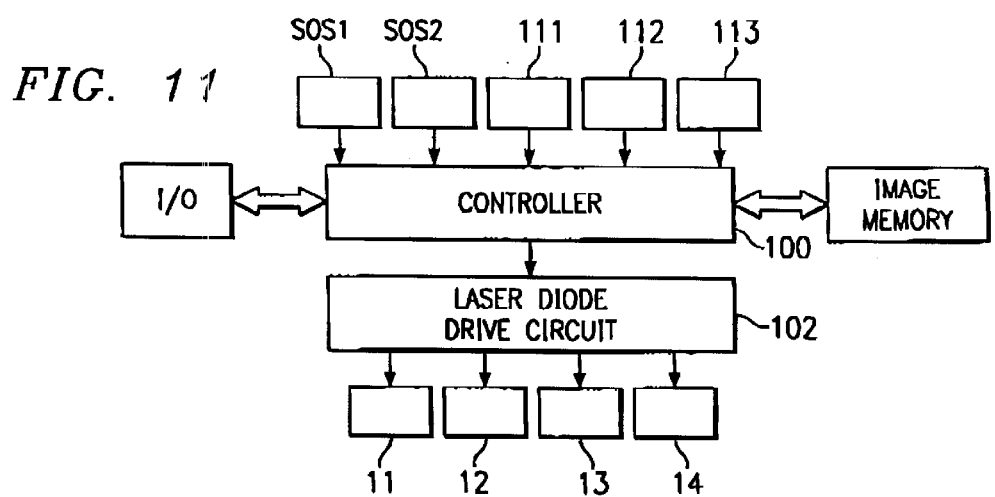
FIG. 11 illustrates the control section of the aforesaid printer.

An electrostatic latent image is formed on the surface of the photosensitive drums 91~94 via a multi-beam optical scanning device. This optical device comprises four laser diodes 11, 12, 13, 14 and collimator lenses 21, 22, 23, 24, polygonal scanner 5 which rotates at a steady speed, and a plurality of mirrors and lenses. FIG. 11 shows the controller 100 used in conjunction with laser diodes 11~14, which are modulated based on image data input to drivecircuit 102. Laser diode 11 is driven based on cyan (C) image data, laser diode 12 is driven based on magenta (M) image data, laser diode 13 is driven based on yellow (Y) image data, and laser diode 14 is driven based on black (Bk) image data.

A laser beam emitted from laser diode 11 is collimated by lens 21, directed by mirror 41, and impinges the top half of cylindrical lens 31. The light beam is linearly condensed in the vicinity of the deflecting surface of polygonal scanner 5 by lens 31, so as to be deflected at equiangular speed based on the rotation of scanner 5. The deflected laser beam is transmitted through the bottom half of scanning lenses 611 and 612, and is reflected downward by mirror 81. The laser beam is transmitted through scanning lens 613, and forms an image on the surface of photosensitive drum 91; scanning is in direction indicated by arrow a.

A laser beam emitted from laser diode 12 is collimated by lens 22, reflected by mirror 41, and impinges the bottom half of cylindrical lens 31. The light beam is linearly condensed in the vicinity of the deflecting surface of polygonal scanner 5 by lens 31, so as to be deflected at equiangular speed based on the rotation of said scanner 5. The deflected laser beam is transmitted through the top half of scanning lenses 611 and 612, and is reflected downward by mirror 71. The laser beam is reflected by mirrors 82 and 83, transmitted through scanning lens 614, and forms an image on the surface of photosensitive drum 92; scanning is in direction indicated by arrow a.

A laser beam emitted from laser diode 13 is collimated by lens 23, reflected by mirror 42, and impinges the bottom half of cylindrical lens 32. The light beam is linearly condensed in the vicinity of the deflecting surface of polygonal scanner 5 by lens 32, so as to be deflected at equiangular speed based on the rotation of said scanner 5. The deflected laser beam is transmitted through the top half of scanning lenses 621 and 622, and is reflected downward by mirror 72. The laser beam is reflected by mirrors 85 and 86, transmitted through scanning lens 624, and forms an image on the surface of photosensitive drum 93; scanning is in direction indicated by arrow a'.

A laser beam emitted from laser diode 14 is collimated by lens 24, directed upward by mirror 42, and impinges the top half of cylindrical lens 32. The light beam is linearly condensed in the vicinity of the deflecting surface of polygonal scanner 5 by lens 32, so as to be deflected at equiangular speed based on the rotation of said scanner 5. The deflected laser beam is transmitted through the bottom half of scanning lenses 621 and 622, and is reflected downward by mirror 84. The laser beam is transmitted through scanning lens 623, and forms an image on the surface of photosensitive drum 94; scanning is in direction indicated by arrow a'.

A two dimensional electrostatic latent image is formed on the surface of each photosensitive drum 91~94 via a main scan in the arrow a or arrow a' direction, and a subscan via the rotation of drums 91~94 in the arrow b' direction.

Scanning lenses 611~614 and 621~624 possess image forming characteristics to form images on the surface of photosensitive drums 91~94 via laser beams, and fθ characteristics to correct the laser beam deflected at equiangular speed by polygonal scanner 5 to steady speed in the main scan direction. The fθ characteristics are unnecessary when an fθ correction process is executed on the image data themselves.

The photosensors SOS1 and SOS2 receive the light reflected by mirrors 43 and 44, respectively, on the upstream side in the arrow a or arrow a' direction, and output start signals to controller 100 for image writing by the laser beams emitted from laser diodes 11 and 14, so as to synchronize image formation in a direction perpendicular to the image (i.e., the subscan direction). The output of photosensor SOS1 which receives the light emitted from laser diode 11 is used together with the write start signal of the laser beam emitted from laser diode 12. The output of photosensor SOS2 which receives the light emitted from laser diode 14 is used together with the write start signal of the beam emitted from laser diode 13.

As previously described, in apparatuses which reproduce full color images by overlaying on a sheet the toner images formed by a plurality of image forming units, it is very important to align the positions of the image formed by each image forming unit. When each image dislocates, the result is variation in color and color drift which markedly reduce image quality.

Therefore, the first embodiment provides a means to detect the amount of positional dislocation of each image, and a means to correct the position of the images formed by each image forming unit in accordance with the detected amount of positional dislocation. That is, a registration pattern of predetermined shape is formed by each image forming unit, the images are overlaid on a transfer belt 10, the overlaid registration pattern is optically detected and the amount of dislocation is calculated. The shape of the registration patterns comprise straight lines 55 extending in the main scan direction, and two diagonal lines 56 extending in bilateral directions from the center of straight line 55, as shown in FIGS. 1 and 2.

Figure 2:
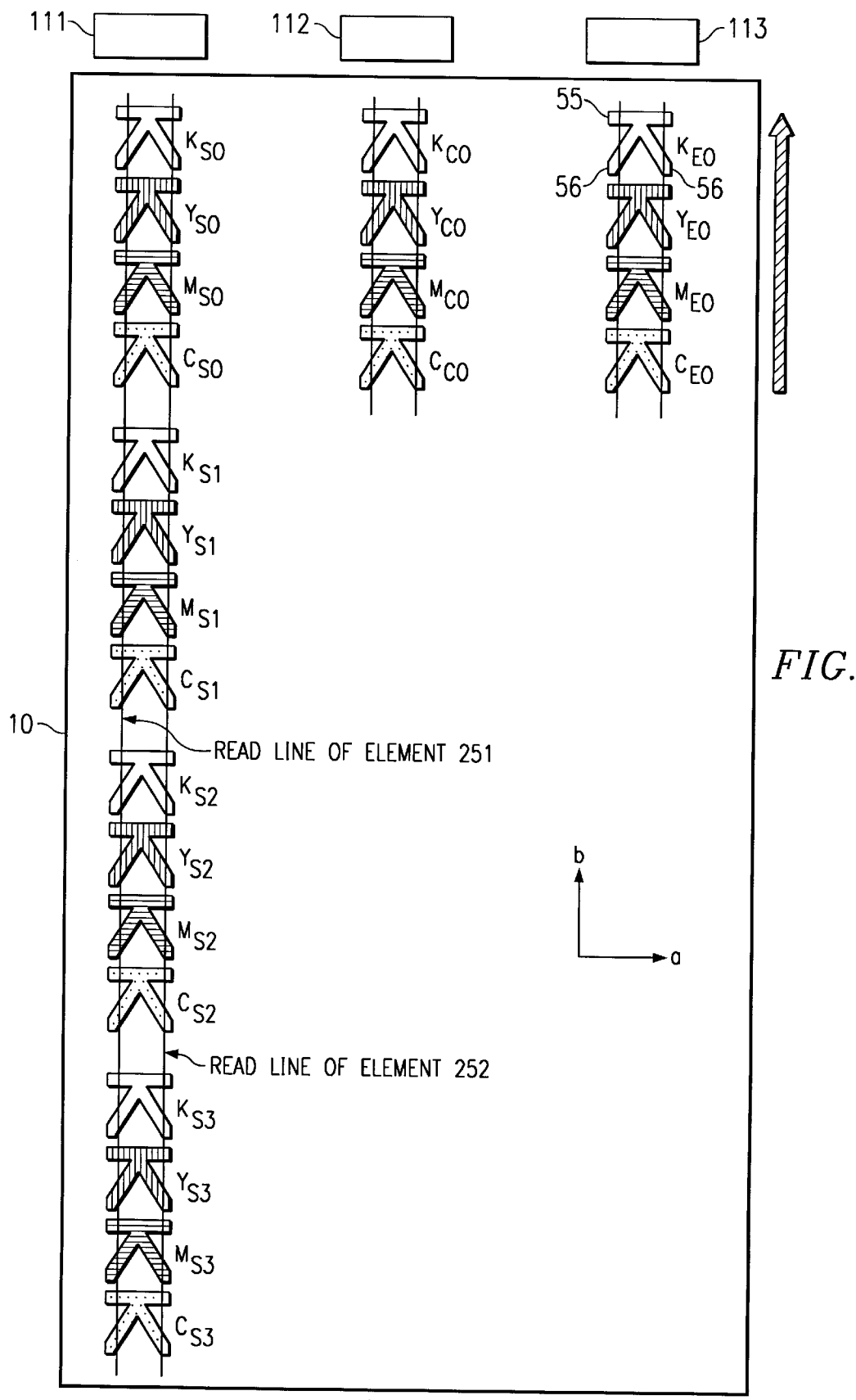
FIG. 2 is a plan view showing a registration pattern formed on a transfer belt in the aforesaid printer.
Figure 3A:
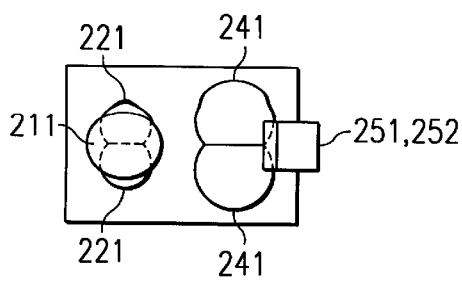
FIG. 3(A) is a plan view of a registration pattern detecting device.
Figure 3B:
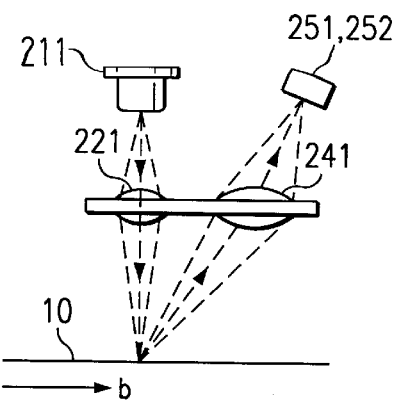
FIG. 3(B) is a side view of same.
Figure 3C:
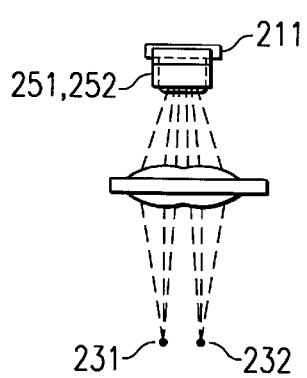
FIG. 3(C) is a front view of same.
Figure 3D:
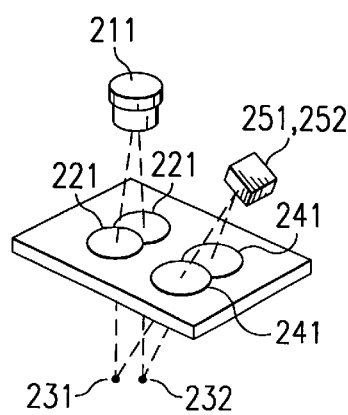
FIG. 3(D) is a perspective view of same.

As shown in FIG. 2, the registration patterns comprise black pattern Ks0, Kc0, Ke0, yellow patterns Ys0, Yc0, Ye0, magenta patterns Ms0, Mc0, Me0, and cyan patterns Cs0, Cc0, and Ce0 formed at three locations at equal intervals in the main scan direction a, and at predetermined intervals in the subscan direction b. The patterns (Ks1, Ys1, Ms1, Cs1), (Ks2, Ys2, Ms2, Cs2), . . . (Ksi, Ysi, Msi, Csi) are formed at predetermined intervals in the subscan direction in the same positions as pattern Ks0 in the main scan direction.

When there is no dislocation in the position of any image, each registration pattern is formed at standard predetermined intervals on transfer belt 10, as shown in FIG. 2. In actual practice, however, there occur multiple dislocations including dislocation of the writing position in the main scan direction, dislocation of the writing position in the subscan direction, dislocation of magnification in the main scan direction, dislocation of magnification in the subscan direction, dislocation of curvature in the main scan direction, and dislocation of curvature in the subscan direction due to skewing, undulation, wrinkling, and fishtailing of the transfer belt 10, dislocation of inclination in the main scan direction, dislocation of magnification in the subscan direction, partial dislocation of magnification in the subscan direction and the like. Ultimately, there is positional dislocation of the image of each color, such that the registration patterns cannot be formed at a predetermined position. That is, positional dislocation of an image is expressed as a shifting of the registration pattern from a predetermined position.

Figure 4A:
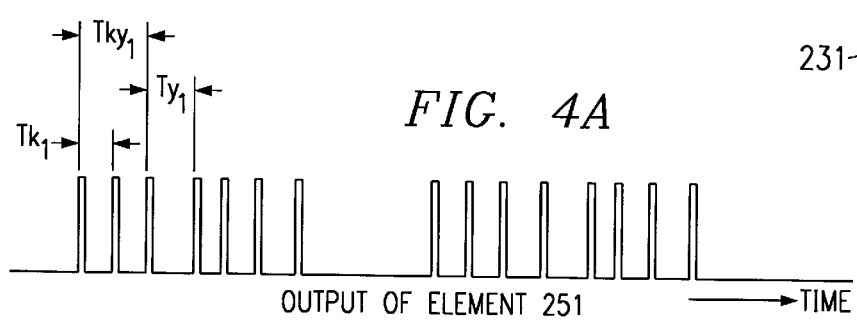
FIG. 4 is a chart showing the output waveform of the detecting device.
Figure 4B:
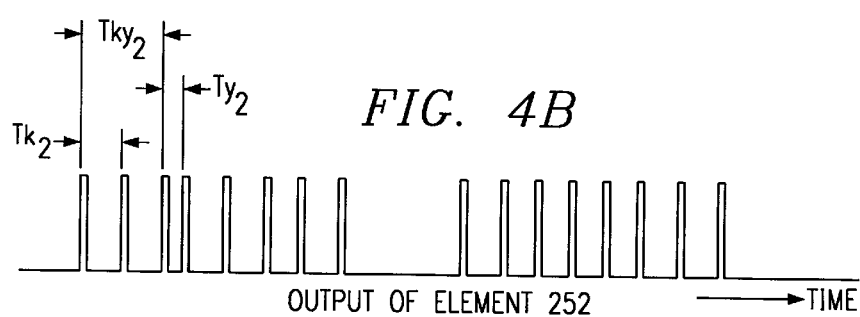

Detection devices 111, 112, and 113 are disposed at pattern forming positions in the main scan direction to detect the position of the registration pattern. Each detection device comprises photoemitter elements 211, photoconverter elements 251 and 252, and lenses 221 and 241, as shown in FIG. 3. Light emitted from photoemitter element 211 is transmitted through spot forming lenses 221 and 221 so as to form small spots 231 and 232 separated at a predetermined distance in the main scan direction on transfer belt 10. The light reflected from spots 231 and 232 is transmitted through condenser lenses 241 and 241 so as to focus on photoconverter elements 251 and 252. Photoconverter elements 251 and 252 convert the received light quantity into electric signals, which are output to a signal processor. The output of photoconverting elements 251 and 252, changes periodically due to the difference in light reflectivity of each registration pattern and the background area of the transfer belt 10, and is received by controller 100. Controller 100 compares the output voltage to reference voltages for each color, and binarizes the data. The reference voltages are set between signal levels corresponding to the background of the transfer belt 10 and the signal levels corresponding to the pattern of each color. FIGS. 4(A) and 4(B) show the binarized output signals from photoconverter elements 251 and 252.

The detection of positional dislocation is accomplished by measuring the amount of shifting of the image of each color relative to the image of the color used as reference. In this embodiment, the black image is used as a reference, and the positional dislocation of the images of the other colors are detected, and corrected. Since this correction is accomplished by image data culling and interpolation (described later), there is a slight deterioration in image quality due to the correction. Accordingly, the use of the most visually prominent color black as a reference and correction of the positions of images of other colors suppresses the total image quality loss due to correction to a minimum limit.

The method of detecting positional dislocation is described below.

Equation (1) below expresses the relative amount of positional dislocation $\Delta XYs0$ in the main scan direction of the yellow pattern Ys0 relative to the reference black pattern Ks0 detected by detection device 111 shown in FIG. 2.

$$\Delta XYs0 = \alpha1\{(Tk1-Tk2)-(Ty1-Ty2)\} \quad (1)$$

Where the following definitions pertain.

$\alpha1$: Constant.
Tk1: Time for spot 231 to intersect the black pattern.
Tk2: Time for spot 232 to intersect the black pattern.
Ty1: Time for spot 231 to intersect the yellow pattern.
Ty2: Time for spot 232 to intersect the yellow pattern.

The relative positional dislocation $\Delta YYs0$ in the subscan direction of pattern Ys0 relative to pattern Ks0 is expressed by Equation (2) below.

$$\Delta YYs0 = \alpha2\{(Tky1+Tky2)\} \quad (2)$$

Where the following definitions pertain.

$\alpha2$: Constant.
Tky1: Time for spot 231 to arrive at the leading edge of the yellow pattern after intersecting the black pattern.
Tky2: Time for spot 232 to arrive at the leading edge of the yellow pattern after intersecting the black pattern.

Similarly, the relative amounts of positional dislocation $\Delta XMs0$, $\Delta YMs0$, $\Delta XCs0$, $\Delta YCs0$ of magenta pattern Ms0 and cyan pattern Cs0 can be detected. The amount of positional dislocation $\Delta XYc0$, $\Delta YYc0$, $\Delta XMc0$, $\Delta YMc0$, $\Delta XCc0$, $\Delta YCc0$, $\Delta XYe0$, $\Delta YYe0$, $\Delta XMe0$, $\Delta YMe0$, $\Delta XCe0$, $\Delta YXe0$ of each pattern can be similarly detected by the other detecting devices 112 and 113.

Figure 5:
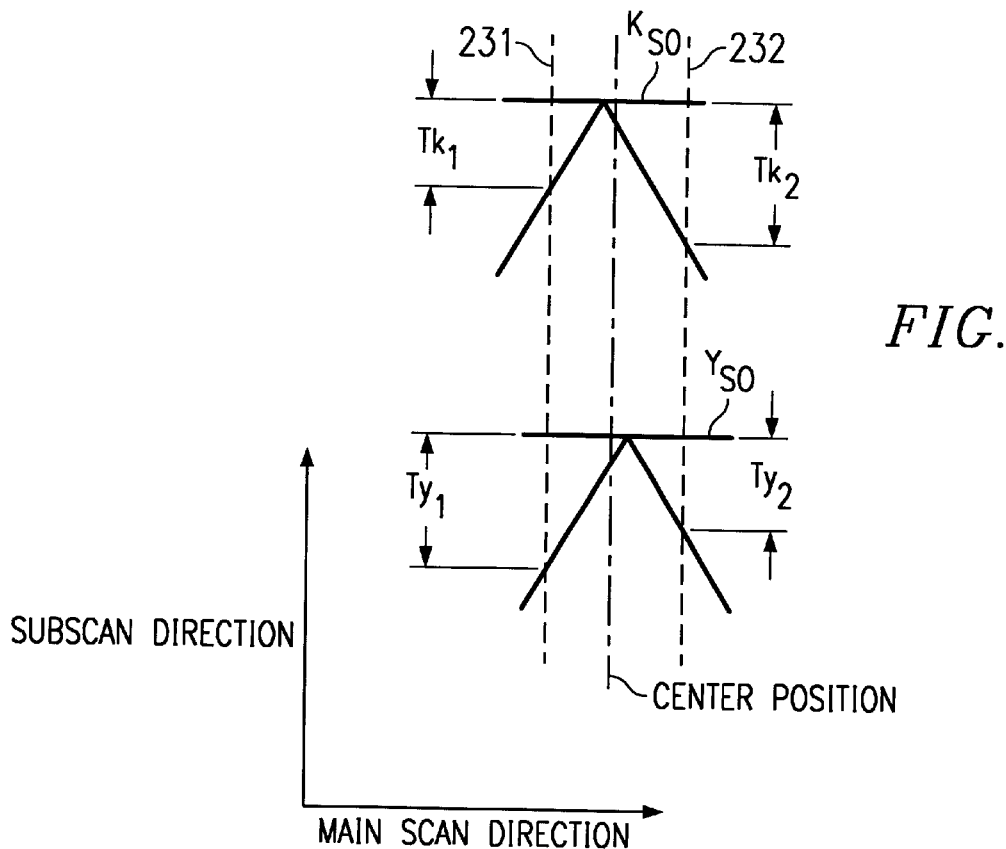
FIG. 5 illustrates the detection state of the registration pattern.

The detection of the aforesaid positional dislocations is described below with reference to FIG. 5.

When Tk1−Tk2=0, the center of the black pattern KS0 matches the center position between spots 231 and 232. When Tk1−Tk2≠0, the pattern Ks0 is shifted. That is, when Tk1−Tk2<0, the pattern Ks0 is shifted to the left, as shown in FIG. 5. When Tk1−Tk2>0, pattern Ks0 is shifted to the right. Accordingly, the direction and amount of dislocation from the center position of pattern Ks0 can be determined by the value of Tk1−Tk2. This calculation is identical for yellow pattern Ys0 and other patterns. In other words, the absolute position of a pattern can be determined by the expression (Tk1−Tk2) and (Ty1−Ty2), and the amount of positional dislocation in the main scan direction among the patterns can be determined by (Tk1−Tk2)−(Ty1−Ty2).

A single pattern is detected at two locations in the main scan direction via two photoreceptor elements in the first embodiment because when a pattern is detected at only a single location via a single element 252 (spot 232), detection error increases greatly due to the irregular speed of transfer belt 10. That is, when the speed of transfer belt 10 fluctuates from V to kV, the value Ty2 becomes kTy2, and $\alpha1$(Tk2−kTy2) is detected as the amount of dislocation of pattern Ys0 in the main scan direction. In the present embodiment, the value becomes k(Ty1−Ty2) relative to pattern Ys0, such that the amount of positional dislocation in the main scan direction is detected as α1{(Tk1−Tk2)−k(Ty1−Ty2)}. Comparison of these expressions reveals |Ty1−Ty2|<Ty2, such that the detection error due to irregular speed of transfer belt 10 is reduced to the error level of a timer value error in the present embodiment.

As previously described, the relative positional dislocation of the images mainly comprises dislocation of the writing position in the main scan direction, dislocation of the writing position in the subscan direction, dislocation of magnification in the main scan direction, partial dislocation of magnification in the main scan direction, dislocation of curvature in the main scan direction, dislocation of curvature in the subscan direction, dislocation of inclination in the main scan direction, dislocation of magnification in the subscan direction, partial dislocation of magnification in the subscan direction and the like. In the present embodiment, a registration pattern is detected at two points in the main scan direction among three locations in the main scan direction, and the amount of dislocation in the main scan direction and the subscan direction is calculated and optimum correction is executed.

Figure 6:
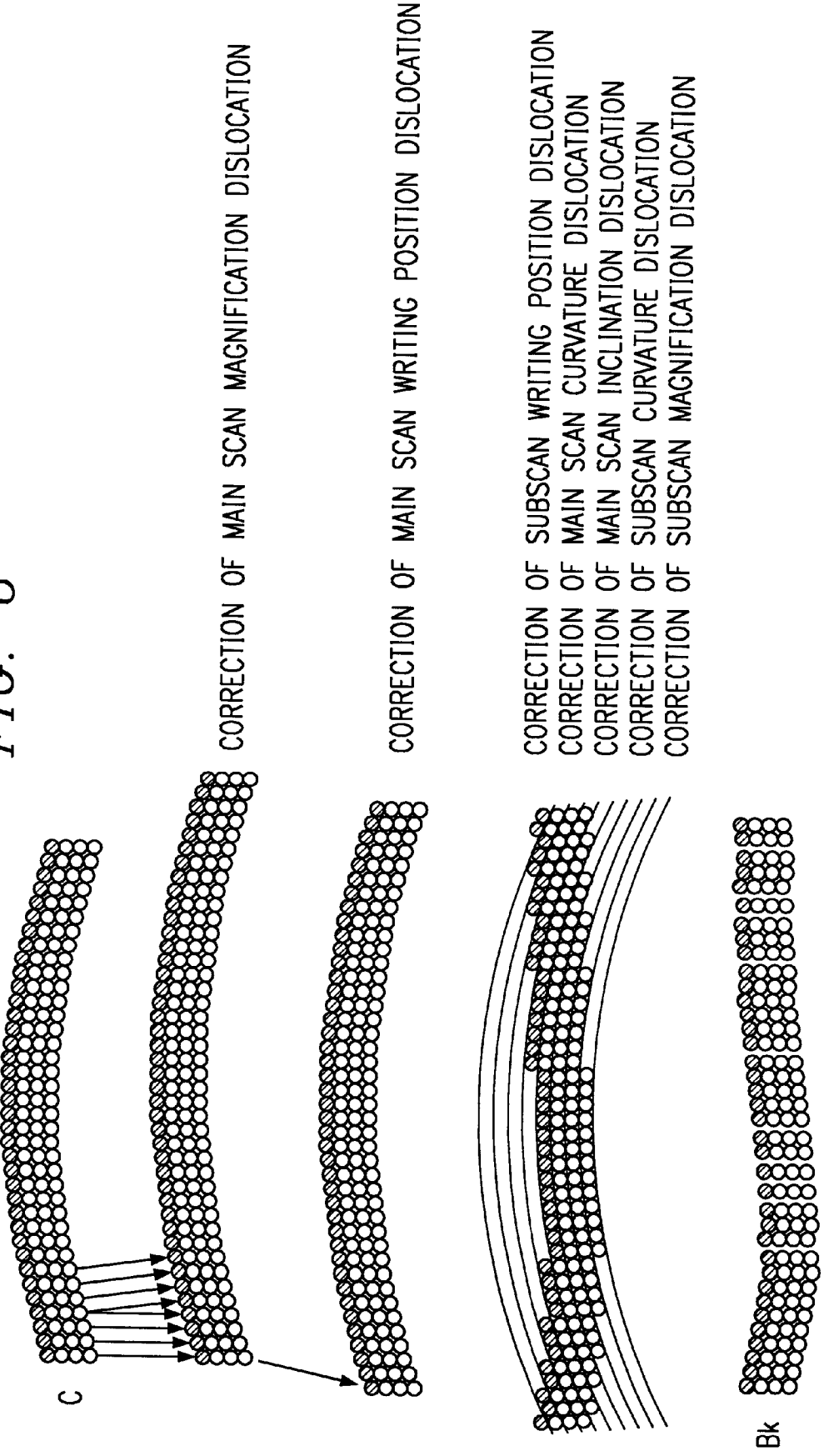
FIG. 6 is a conceptual drawing of the image data electrical correction method.

Main scan writing position dislocation means an error of the write timing of image data of each single scan line. This error is caused by adjustment errors and mounting precision errors of the optical devices. Correction is accomplished by varying the time from the generation of the photoreception signal of photosensor SOS1 and SOS2 until the writing of the image (refer to FIG. 6). In the present embodiment, the deflection surfaces of polygonal scanner 5 are different for the surface deflecting the black and yellow scanning beams and the surface deflecting the magenta and cyan scanning beams, such that photosensor SOS1 is provided for black and yellow colors, and photosensor SOS2 is provided for magenta and cyan colors. Correction is accomplished by changing the delay time from the generation of the photoreception signal of photosensor SOS1 until the writing of the yellow image, so as to have the allowed amount of positional dislocation of main scan writing is less than ε1 by presetting ΔXYs0. Similarly, correction is accomplished by setting ΔXMs0 and ΔXCs0 at less than ε1.

Subscan writing position dislocation means an error in the write timing of an image. This error is caused by adjustment error and mounting precision errors of the optical devices. This error is corrected by changing the time from the generation of the subscan synchronization signal until the image is written (refer to FIG. 6). that is, correction is accomplished by changing the delay time from the generation of the subscan synchronization signal until the yellow image is written, so as to have the allowed amount of positional dislocation of subscan writing less than ε2 by presetting ΔYYs0. Similarly, correction is accomplished by setting ΔYMs0, and ΔYCs0 at less than ε2.

Main scan magnification dislocation means an error of the length of the scan line. This error is caused by errors of the optical path length due to adjustment error and mounting precision error of the optical devices, and focal length error of the scanning lenses. Main scan partial magnification dislocation means an inclination of the photosensitive member in the depth direction relative to the optical device, and dispersion of the fθ characteristics of the scanning lens. This error is caused by processing error, adjustment error and mounting precision error of the scanning lens. Main scan magnification dislocation can be corrected if the main scan partial magnification dislocation is adjusted. That is, If partial magnification is matched in all parts, then it also matches the total magnification.

The dispersion of fθ characteristics of the scanning lens is such that dislocation will not occur if scanning lenses 611, 612, 621, and 622 have the same characteristics. Scanning lenses formed of resin material produce dislocation from fθ characteristics due to molding distortion. This distortion is within the allowed range due to matching gates of the metal mold. Therefore, dislocation of images of other colors relative to the black image is mainly dislocation generated by inclination in the depth direction of the photosensitive member relative to the optical device.

Figure 7:
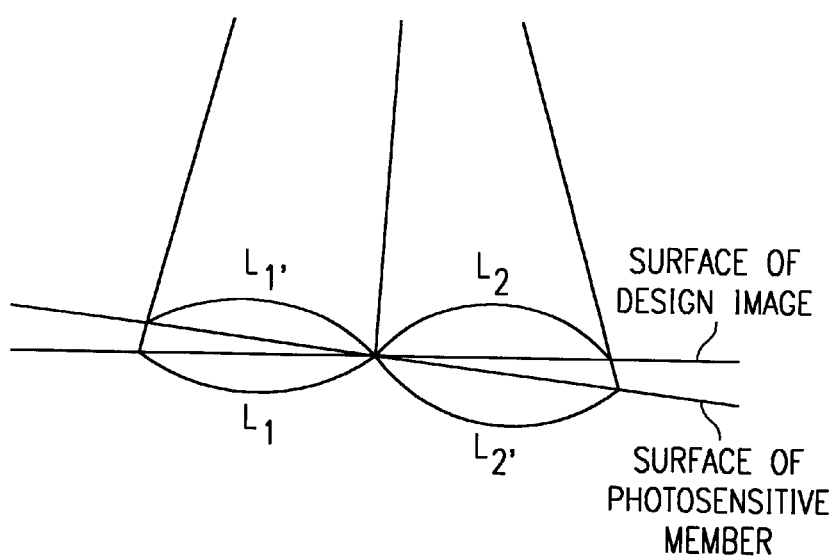
FIG. 7 illustrates the change in the main scan partial magnification.

FIG. 7 shows the change in partial magnification in the main scan direction due to inclination in the depth direction of the photosensitive member relative to the optical device. This change is caused by a change in the incident angle of the scanning beam on the surface of the photosensitive member. In the present embodiment, the difference in inclination in the depth direction of the photosensitive member relative to the optical device is estimated from the amount of dislocation of the image in the main scan direction, and optimum correction is executed.

Specifically, when correcting the yellow image, the number and position of image data to be culled and interpolated are determined by combining {(ΔXYs0−ΔXYc0) and (ΔXYc0−ΔXYe0)}. A table specifying the number and position of image data culled and interpolated is prepared beforehand and referenced in determining the aforesaid combination. The main scan partial magnification is corrected by culling and interpolating the image data at the determined locations (refer to FIG. 6).

Similarly, when correcting magenta and cyan images, the number and positions of image data to be culled and interpolated are determined by combining {(ΔXMs0−ΔXMc0) and (ΔXMc0−ΔXMe0)}, and combining {(ΔXCs0−ΔXCc0) and (ΔXCc0−ΔXCe0)}. Main scan partial magnification of magenta and cyan images is corrected by culling and interpolating image data in the same manner as described above. When the amount of dislocation is large and a broad correction range must be set, it is practical to use a method which divides the main scan direction image data to evenly change the magnification in the divided range.

Curvature in the main scan direction is curvature of the scan line, and dislocation of this curvature is caused by errors in processing the optical elements, mounting error, and adjustment error. Main scan direction inclination means the scan line is inclined relative to the rotational axis of the photosensitive member. Dislocation of this inclination is caused by mounting error of the optical device, and mounting error of the photosensitive member. Main scan direction curvature dislocation and main scan direction inclination dislocation are corrected by dividing the image data of one scan line into a plurality of areas, and shifting the write timing of each area (i.e., writing the image of a single line with a plurality of scan lines). That is, the amount of shift in the write timing and the percentage area of image data of one scan line is determined by combining {(ΔYYc0−ΔYYs0) and (ΔYYe0−ΔYYs0)}. A table specifying the amount of timing shift and the percentage area of image data of one scan line is prepared beforehand and referenced in determining the aforesaid combination. The curvature dislocation and inclination dislocation are corrected by changing the address of image data in accordance with the write timing and the determined percentage area (refer to FIG. 6). Magenta and cyan images are similarly corrected.

Curvature dislocation in the subscan direction is caused by temporal variation of the transfer belt position relative to the writing position in the main scan direction. This dislocation is mainly caused by fishtailing of the transfer belt.

Curvature dislocation in the main scan direction is corrected by changing the time from the generation of the detection signal by SOS1 and SOS2 until the start of image writing for each single scan line. Specifically, the amount of positional dislocation in the main scan direction of the yellow pattern relative to the black pattern is designated $\Delta XYs0$, $\Delta XYs1$, . . . $\Delta XYsn$. When the line to be corrected is between patterns $Ysj$ and $\Delta Ysj+1$, correction is accomplished by determining the correction amount $\Delta XYji$ of target line i from the leading edge position of pattern $Ysj$ via Equation (3) below, and changing the image writing starting time from the detection signal generation by photosensors SOS1 and SOS2.

$$\Delta XYji=\Delta XYsj-\Delta XYs0+(\Delta XYsj+1-\Delta XYsj)*(i/m) \qquad (3)$$

Magenta and cyan images are similarly corrected.

Subscan magnification dislocation, and subscan partial magnification dislocation are generated by irregular speed of the transfer belt, and relative rotational speed difference of the photosensitive drum. These dislocations are caused by uneven rotation and rotational speed error of the drive motor, eccentricity of the rotational axis of the photosensitive member, diameter difference of the photosensitive member, eccentricity of the support rollers of the transfer belt and the like. These magnification dislocations, are corrected by culling and interpolating image data of each single scan line. The amount of positional dislocation in the subscan direction of the yellow pattern relative to the black pattern is designated $\Delta XYs0$, $\Delta XYs1$, $\Delta XYsn$. The correction target amount $Ey1$ is expressed by Equation (4) below.

$$Ey1=\Delta YYs1-\Delta YYs0 \qquad (4)$$

The number and position of image data to be culled or interpolated are determined by the value of the correction target amount $Ey1$. The uncorrected amount $\epsilon y1$ is expressed by Equation (5) below, and the uncorrected amount $\epsilon y1$ is added to the next section and designated the correction target amount $\epsilon 1$ is added to the next section and designated the correction target amount.

$$\epsilon y1=Ey1-P \cdot k \qquad (5)$$

Where the following definitions pertain.

p: Pitch in the subscan direction.

k: integer representing smallest $|\epsilon y1|$.

A table determining the number and position of image data to be culled and interpolated is prepared beforehand via the value of correction target amount $\epsilon y1$, and is referenced to make the determination. Magenta and cyan images are similarly corrected.

A second embodiment of the image forming apparatus of the present invention is described hereinafter with reference to the accompanying drawings. The second embodiment of the present invention described below is also applied to a full color printer just as in the first embodiment.

Figure 8:
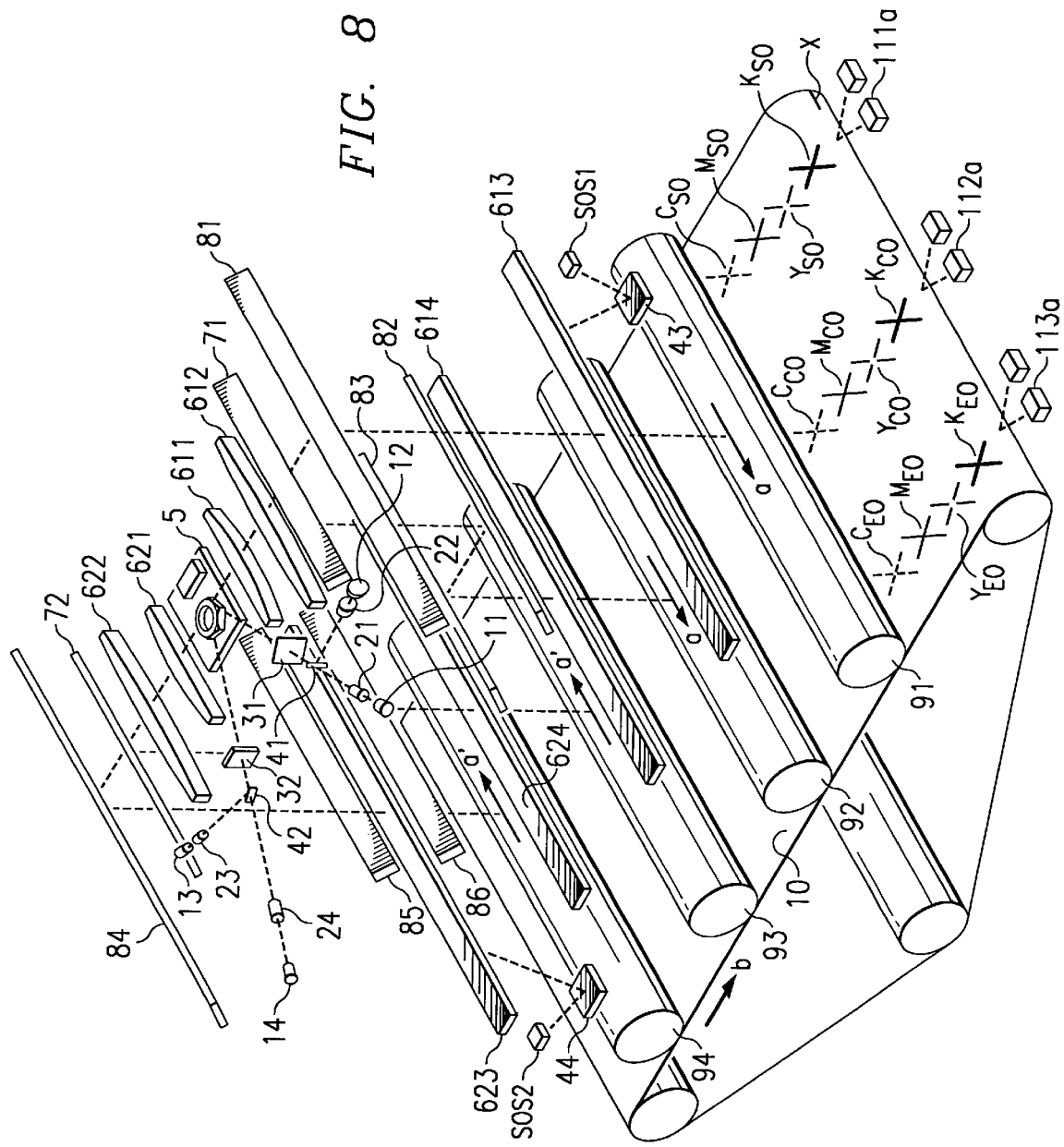
FIG. 8 is a brief perspective view of a full color laser printer of a second embodiment of the invention.
Figure 9:
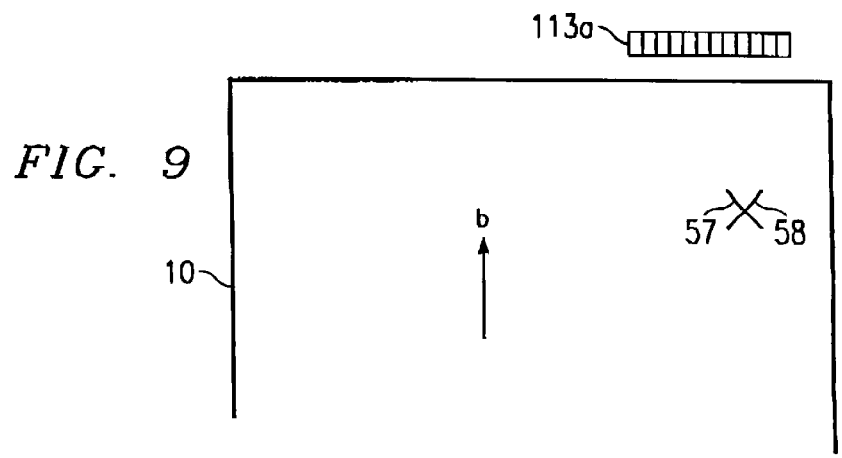
FIG. 9 is a plan view showing the positional relationship between the line sensor and the registration pattern formed on a transfer belt in the printer.

In the second embodiment, the shape of the registration pattern comprises two intersecting lines 57 and 58 inclined relative to the direction of travel of transfer belt 10 (i.e., arrow b direction), as show in FIGS. 8 and 9.

As shown in FIG. 8, the registration patterns comprise black pattern Ks0, Kc0, Ke0, yellow patterns Ys0, Yc0, Ye0, magenta patterns Ms0, Mc0, Me0, and cyan patterns Cs0, Cc0, and Ce0 formed at three locations at predetermined intervals in the main scan direction a at positions a predetermined distance in the subscan. direction b from a reference position X of transfer belt 10, and at predetermined intervals in the subscan direction b. Since a plurality of samples are taken to increase detection accuracy, a plurality of these registration patterns may be formed.

Figure 10:
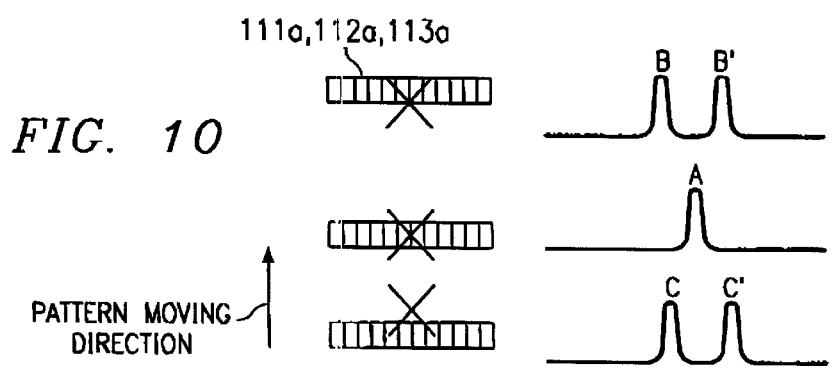
FIG. 10 is a chart showing the sensor output waveform and the registration pattern position relative to the line sensor.

Detection devices 111a, 112a, and 113a are disposed at pattern forming positions in the main scan direction to detect the position of the registration pattern. Each detection device comprises a line sensor of a length sufficient to cover the registration pattern in the main scan direction, as shown in FIG. 9. The position of the registration pattern and the detection output waveform of the pattern are shown in FIG. 10. The pattern center position can be detected by averaging the output waveform from the center position. Even when output waveform A is unclear, the center position can be detected by calculating the midpoint between output waveforms B,B' and C,C', and the midpoint of output waveforms B,B' or C,C'. The amount of positional dislocation can be calculated by comparing the center positions of each detected registration pattern.

The amount of relative positional dislocation in the main scan direction of yellow pattern Ys0 relative to the reference black pattern Ks0 is designated $\Delta XYs0$. Similarly, the amount of relative positional dislocation of magenta pattern Ms0 and cyan pattern Cs0 relative to the reference black pattern Ks0 are designated $\Delta XMs0, \Delta YMs0$, $\Delta XCs0$, and $\Delta YCs0$. The amount of positional dislocation of each registration pattern detected by the other detection devices 112a and 113a are designated $\Delta XYc0, \Delta YYc0, \Delta XMc0, \Delta YMc0, \Delta XCc0, \Delta YCc0, \Delta XYe0, \Delta YYe0, \Delta XMe0, \Delta YMe0, \Delta XCe0$, and $\Delta YCe0$. In the present embodiment, the registration patterns are detected at three locations in the main scan direction, the amount of dislocation in the main scan and subscan directions are calculated, and optimum correction is executed, and the correction amount can be determined by calculations identical to those of the first embodiment.

The image forming apparatus of the present invention is not limited to the previously described embodiments and may be variously modified insofar as such modification do not depart from the scope of the invention.

In particular, the present invention may be applied to various image forming processes of a broad range of devices in addition to tandem type full color printers including inkjet printers insofar as such devices form overlaid images based on data of a plurality of images.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. An image forming apparatus comprising:
    a plurality of recording units for forming images based on their respective image data, and for forming a plurality of registration patterns of predetermined shape;
    a transfer member for moving in a predetermined direction of travel and for receiving the plurality of registration patterns thus formed by the plurality of recording units; and
    a detection device for detecting each registration pattern on the transfer member in at least two locations which are spaced apart from each other with each location being on a respective different one of a plurality of lines that intersect said registration patterns and that extend parallel to the direction of travel of the transfer member to output non-integrated detection values based thereon.

2. An apparatus in accordance with claim 1, wherein the detection device detects each registration pattern on the transfer member a plurality of times in the direction of travel of the transfer member.

3. An apparatus in accordance with claim 2, wherein each of the plurality of registration patterns comprises a first line extending perpendicular to the direction of travel of the transfer member, and two oblique lines crossing at a center position of a respective first line.

4. An image forming apparatus comprising:

a transfer member for moving in a predetermined direction of travel;

a first recording unit for forming an image;

a second recording unit for forming an image;

a controller for controlling the first recording unit and the second recording unit to form a plurality of predetermined registration patterns and transfer said predetermined registration patterns onto the transfer member; and a detection device for detecting each registration pattern on the transfer member in at least two locations which are spaced apart from each other with each location being on a respective different one of a plurality of lines that intersect said registration patterns and that extend parallel to the direction of travel of the transfer member to output non-integrated detection values based thereon.

5. An apparatus in accordance with claim 4, wherein the detection device detects each registration pattern on the transfer member a plurality of times in the direction of travel of the transfer member.

6. An apparatus in accordance with claim 5, wherein each of the plurality of registration patterns comprises a first line extending perpendicular to the direction of travel of the transfer member, and two oblique lines crossing at a center position of a respective first line.

7. An apparatus in accordance with claim 4, further comprising:

a correction controller for, on the basis of a result of detection by the detection device, calculating an amount of dislocation between the registration patterns formed by the first recording unit and the second recording unit and for correcting positions of the images to be formed by the first recording unit and the second recording unit based on thus calculated amount of dislocation.

8. An image forming apparatus comprising:

a plurality of recording units for forming images based on their respective image data;

a transfer member for moving in a predetermined direction of travel;

a controller for causing the plurality of recording units to form a plurality of registration patterns and transfer them onto the transfer member, wherein each of the plurality of registration patterns has a shape symmetrical about a direction of travel of the transfer member and a direction perpendicular to the direction of travel of the transfer member; and a line sensor for detecting each of the plurality of registration patterns on the transfer member, the line sensor extending along the direction perpendicular to the direction of travel of the transfer member and covering a predetermined range of the registration pattern.

9. An apparatus in accordance with claim 8, further comprising:

a correction controller for calculating an amount of dislocation between the plurality of registration patterns on the transfer member based on a result of detection by the line sensor, and for correcting positions of the images to be formed by the plurality of recording units based on the thus calculated amount of dislocation.

10. An apparatus in accordance with claim 8, wherein each of the plurality of registration patterns comprises two non-parallel lines which intersect at a point and each of which extends at an incline relative to the direction of travel of the transfer member, and extends at an incline relative to a direction perpendicular to the direction of travel of the transfer member.

11. An apparatus in accordance with claim 1, wherein each recording unit forms at least two registration patterns along the direction perpendicular to the direction of travel of the transfer member.

12. An apparatus in accordance with claim 11, wherein each of the plurality of registration patterns comprises a first line extending perpendicular to the direction of travel of the transfer member and two oblique lines crossing at a center position of a respective first line.

13. An apparatus in accordance with claim 11, wherein each set of the at least two registration patterns formed by each recording unit is transferred onto the transfer member at different positions in the direction of travel of the transfer member.

14. An apparatus in accordance with claim 13, wherein each of the plurality of registration patterns comprises a first line extending perpendicular to the direction of travel of the transfer member and two oblique lines crossing at a center position of a respective first line.

15. An apparatus in accordance with claim 8, wherein the line sensor covers the entire registration pattern in the direction perpendicular to the direction of travel of the transfer member.

16. An apparatus in accordance with claim 8, wherein each recording unit forms at least two registration patterns along the direction perpendicular to the direction of travel of the transfer member.

17. An optical detection apparatus comprising:

a single light source for emitting light;

a first optical system for imaging at least two light images of the thus emitted light on a surface, the surface deflecting the light images;

a second optical system for collecting at least two deflected images; and sensors for responding to the collected deflected light images, each sensor outputting a signal, wherein a quantity of said signals corresponds to a quantity of light images imaged by the first optical system.

18. An apparatus in accordance with claim 1 wherein the detector for detecting each registration pattern includes:

a single light source for emitting light;

a first optical system for imaging at least two light images of the thus emitted light on a surface, the surface deflecting the light images;

a second optical system for collecting at least two deflected light images; and photosensors for responding to the collected deflected light images, each photosensor outputting a signal, wherein a quantity of said signals corresponds to a quantity of light images imaged by the first optical system.

19. An apparatus in accordance with claim 16, wherein each set of the at least two registration patterns formed by each recording unit is transferred onto the transfer member at different positions in the direction of travel of the transfer member.

20. A method for detecting dislocation between image forming positions of a plurality of recording units, said method comprising the steps of:

forming a plurality of registration patterns by the recording units;

transferring the registration patterns onto a transfer member moving in a predetermined direction of travel;

detecting each registration pattern on the transfer member by a detection device in at least two locations which are spaced apart from each other with each location being on a respective different one of a plurality of lines that intersect said registration patterns and that extend parallel to the direction of travel of the transfer member to output non-integrated detection values based thereon; and calculating an amount of dislocation between the registration patterns based on result of detection at the step of detecting.

21. A method for detecting dislocation between image forming positions of a plurality of recording units, said method comprising the steps of:

forming a plurality of registration patterns by the recording units;

transferring the registration patterns onto a transfer member moving in a predetermined direction of travel, wherein each registration pattern has a shape symmetrical about a direction of travel of the transfer member and a direction perpendicular to the direction of travel of the transfer member;

detecting each registration pattern on the transfer member by a line sensor, the line sensor extending along the direction perpendicular to the direction of travel of the transfer member and covering a predetermined range of the registration pattern; and calculating an amount of dislocation between the registration patterns based on a result of detection at the step of detecting.

* * * * *